(12) United States Patent
Han et al.

(10) Patent No.: US 11,863,750 B2
(45) Date of Patent: *Jan. 2, 2024

(54) IMAGE ENCODING AND DECODING APPARATUS, AND IMAGE ENCODING AND DECODING METHOD USING CONTOUR MODE BASED INTRA PREDICTION

(71) Applicant: Dolby Laboratories Licensing Corporation, San Francisco, CA (US)

(72) Inventors: Jong Ki Han, Seoul (KR); Chan Won Seo, Incheon (KR); Kwang Hyun Choi, Seoul (KR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,006

(22) Filed: Jun. 27, 2022

(65) Prior Publication Data
US 2022/0329806 A1 Oct. 13, 2022

Related U.S. Application Data

(63) Continuation of application No. 15/262,530, filed on Sep. 12, 2016, now Pat. No. 11,418,786, which is a
(Continued)

(30) Foreign Application Priority Data

Feb. 27, 2012 (KR) .................. 10-2012-0019663
Sep. 25, 2012 (KR) .................. 10-2012-0106279

(51) Int. Cl.
*H04N 19/12* (2014.01)
*H04N 19/124* (2014.01)
(Continued)

(52) U.S. Cl.
CPC ......... *H04N 19/124* (2014.11); *H04L 45/745* (2013.01); *H04N 19/11* (2014.11);
(Continued)

(58) Field of Classification Search
None
See application file for complete search history.

(56) References Cited

U.S. PATENT DOCUMENTS 7,566,273 B2 7/2009 Kitsutaka
8,644,596 B1 2/2014 Wu et al.
(Continued)

FOREIGN PATENT DOCUMENTS

EP 2302932 A1 3/2011
JP 2007-020187 A 1/2007
(Continued)

OTHER PUBLICATIONS

Jager, "Simplified Depth Map Intra Coding With an Optional Depth Lookup Table," Institut fur nachrichtentechnik, RWTH Aachen University, Germany, 2012 International Conference on 3D Imaging (IC3D), 2012.
(Continued)

*Primary Examiner* — Chikaodili E Anyikire
(74) *Attorney, Agent, or Firm* — Michael Best & Friedrich LLP

(57) ABSTRACT

According to the present invention, an adaptive scheme is applied to an image encoding apparatus that includes an inter-predictor, an intra-predictor, a transformer, a quantizer, an inverse quantizer, and an inverse transformer, wherein input images are classified into two or more different categories, and two or more modules from among the inter-predictor, the intra-predictor, the transformer, the quantizer, and the inverse quantizer are implemented to perform respective operations in different schemes according to the
(Continued)

category to which an input image belongs. Thus, the invention has the advantage of efficiently encoding an image without the loss of important information as compared to a conventional image encoding apparatus which adopts a packaged scheme.

6 Claims, 6 Drawing Sheets

Related U.S. Application Data continuation of application No. 14/381,378, filed as application No. PCT/KR2013/001551 on Feb. 27, 2013, now abandoned.

(51) Int. Cl.
| | |
|---|---|
| *H04N 19/11* | (2014.01) |
| *H04N 19/117* | (2014.01) |
| *H04N 19/136* | (2014.01) |
| *H04N 19/14* | (2014.01) |
| *H04N 19/159* | (2014.01) |
| *H04N 19/176* | (2014.01) |
| *H04N 19/61* | (2014.01) |
| *H04L 45/745* | (2022.01) |
| *H04N 19/109* | (2014.01) |
| *H04N 19/132* | (2014.01) |
| *H04N 19/17* | (2014.01) |
| *H04N 19/597* | (2014.01) |
| *H04N 19/82* | (2014.01) |

(52) U.S. Cl.
CPC ........... *H04N 19/117* (2014.11); *H04N 19/12* (2014.11); *H04N 19/136* (2014.11); *H04N 19/14* (2014.11); *H04N 19/159* (2014.11); *H04N 19/176* (2014.11); *H04N 19/61* (2014.11); *H04N 19/109* (2014.11); *H04N 19/132* (2014.11); *H04N 19/17* (2014.11); *H04N 19/597* (2014.11); *H04N 19/82* (2014.11)

(56) References Cited

U.S. PATENT DOCUMENTS

| | | | |
|---|---|---|---|
| 9,516,306 B2 * | 12/2016 | Zhang | ................ H04N 19/593 |
| 9,894,385 B2 | 2/2018 | Heo et al. | |
| 2007/0030356 A1 | 2/2007 | Yea et al. | |
| 2008/0130747 A1 | 6/2008 | Moriya et al. | |
| 2008/0310719 A1 | 12/2008 | Kitora | |
| 2010/0046628 A1 | 2/2010 | Bhaskaran et al. | |
| 2010/0119149 A1 | 5/2010 | Hong et al. | |
| 2011/0216833 A1 | 9/2011 | Chen et al. | |
| 2012/0163672 A1 | 6/2012 | Mckinnon | |
| 2012/0170833 A1 | 7/2012 | Kokojima et al. | |
| 2012/0194503 A1 | 8/2012 | Chauvin | |
| 2012/0200669 A1 | 8/2012 | Lai et al. | |
| 2012/0229602 A1 | 9/2012 | Chen et al. | |
| 2013/0003840 A1 | 1/2013 | Gao et al. | |
| 2013/0057646 A1 * | 3/2013 | Chen | ................ H04N 19/174 348/43 |
| 2013/0188013 A1 | 7/2013 | Chen et al. | |
| 2013/0271567 A1 | 10/2013 | Lee et al. | |
| 2013/0287093 A1 * | 10/2013 | Hannuksela | ......... H04N 19/103 375/240.02 |
| 2013/0329008 A1 * | 12/2013 | Takahashi | ............ H04N 13/161 348/43 |
| 2014/0009574 A1 * | 1/2014 | Hannuksela | ......... H04N 19/105 348/42 |
| 2014/0198179 A1 * | 7/2014 | Gu | ........................ H04N 19/13 348/43 |
| 2014/0247871 A1 * | 9/2014 | Merkle | ................... H04N 19/23 375/240.12 |
| 2014/0294061 A1 | 10/2014 | Zhang et al. | |
| 2015/0046455 A1 | 2/2015 | Bi | |
| 2015/0229957 A1 | 8/2015 | Zhao et al. | |

FOREIGN PATENT DOCUMENTS

| | | |
|---|---|---|
| KR | 10-2002-0024484 A | 3/2002 |
| KR | 10-2009-0129939 A | 12/2009 |
| KR | 10-2010-0018810 A | 2/2010 |
| KR | 10-2010-0045549 A | 5/2010 |

OTHER PUBLICATIONS

International Search Report dated Jun. 24, 2013 for Application No. PCT/KR2013/001551.

* cited by examiner

IMAGE ENCODING AND DECODING APPARATUS, AND IMAGE ENCODING AND DECODING METHOD USING CONTOUR MODE BASED INTRA PREDICTION

CLAIM FOR PRIORITY

This application is a Continuation of U.S. patent application Ser. No. 15/262,530, filed on Sep. 12, 2016, which is a Continuation of U.S. patent application Ser. No. 14/381,378 having a 371(c) date of Nov. 17, 2014, now abandoned, which is a National Stage of International Application No. PCT/KR2013/001551, filed Feb. 27, 2013 and published as WO 2013/129822 on Sep. 6, 2013, which claims priority to Korean Patent Applications Nos. 10-2012-0019663 filed on Feb. 27, 2012 and 10-2012-0106279 filed on Sep. 25, 2012 in the Korean Intellectual Property Office (KIPO), the entire contents of which are hereby incorporated by reference.

BACKGROUND

1. Technical Field

Example embodiments of the present invention relate in general to the field of a video encoding/decoding apparatus and more specifically to an apparatus for classifying input images into two or more different categories according to preset attributes and encoding/decoding the images according to the categories of the input images.

2. Related Art

H.264/advanced video coding (AVC) is a standard of a video coder and decoder (CODEC) having a highest compression rate among currently standardized CODECs. In order to improve compression efficiency, predictive encoding is performed on an image using intra-prediction considering directivity, an integer transform in units of 4×4 pixels, block modes having various sizes of 16×16 pixels to 4×4 pixels, or a deblocking filter in the H.264/AVC standard. In addition, in order to find a more accurate motion vector, motion estimation is performed by interpolating an image in units of ½ pixels and units of ¼ pixels in the H.264/AVC standard.

FIG. 1 is a block configuration diagram schematically illustrating a conventional video encoding apparatus, and illustrates a configuration of an example of the encoding apparatus according to the above-described H.264/AVC.

As an apparatus for encoding the image, the conventional video encoding apparatus 100 may be configured to include a predictor 110, a subtractor 120, a transformer 130, a quantizer 140, an encoder 150, an inverse quantizer 160, an inverse transformer 170, an adder 180, and a reference image memory 190.

Hereinafter, an input video to be described is constituted of a series of images and each image is divided into predetermined regions such as blocks.

The predictor 110 includes an intra-predictor for intra-prediction and an inter-predictor for inter-prediction. In particular, the inter-predictor generates a predicted image of the input video using a motion vector of the input video determined according to a motion vector resolution group including a plurality of motion vector resolutions.

The intra-predictor is used for the intra-block and intra-predictive encoding is a scheme of generating a predicted block (image) by predicting the pixel of the current block using pixels of previously encoded blocks within a current image to be currently encoded and restored blocks after decoding and encoding a difference value from the pixel of the current block.

The inter-predictor is used for the inter-block and the inter-prediction refers to a scheme of generating a predicted block by referring to one or more past or future images and predicting a current block within a current image and encoding a difference value from the current block. An image to be referred to encode or decode the current image is referred to as a reference image.

The subtractor 120 generates a residual image by performing a subtraction operation on an input image to be currently encoded and a predicted image, and the residual image includes a residual signal which is a difference between a pixel of the input image and a pixel of the predicted image.

The transformer 130 generates a transformed image having a transform coefficient by transforming the residual signal of the residual image generated by the subtractor 120 into a frequency domain through a scheme such as a Hadamard transform or a discrete cosine transform (DCT). The quantizer 140 generates a quantized transformed image by quantizing the transformed image generated by the transformer 130 through a scheme such as dead zone uniform threshold quantization (DZUTQ), a quantization weighted matrix, or rate-distortion optimized quantization (RDOQ).

The encoder 150 encodes the quantized transformed image and generates a bit stream including encoded data for motion vector resolution. Encoding technology applicable to the encoder 150 is entropy encoding technology or the like.

The inverse quantizer 160 and the inverse transformer 170 restore a residual image by performing inverse quantization and transform processes on some or all quantized transformed images to be transferred from the transformer 130 and the quantizer 140 described above. At this time, the inverse quantizer 160 and the inverse transformer 170 may restore the residual image by inversely performing the transform and quantization schemes in the transformer 130 and the quantizer 140 described above.

The adder 180 is an apparatus for restoring an input image by adding the restored residual image to the predicted image generated by the predictor 110, and the reference image memory 190 may not only store a reference image configured by accumulating restored input images in units of images, but also transfer the reference image stored to predict the next input image so that the above-described predictor 110 utilizes the reference image.

On the other hand, when high efficiency video coding (HEVC), the standardization of which has recently progressed, is used, more efficient encoding than that of the conventional H.264/AVC may be performed. According to the HEVC, the predictor 110 may perform intra-prediction considering various directivities, the transformer 130 may perform a transform operation in a residual quadtree transform (RQT) scheme, and the reference image memory 190 may store a filtered image through an adaptive loop filter (ALF) or sample adaptive offset (SAO) scheme as well as conventional deblocking filtering on a residual image restored from the inverse quantizer 160 and the inverse transformer 170.

In addition, FIG. 4 is a block configuration diagram schematically illustrating a conventional video decoding apparatus, and illustrates a configuration of an example of the decoding apparatus according to the above-described H.264/AVC or HEVC standard or a previous standard.

The conventional video decoding apparatus 400 may be configured to include a decoder 410, an inverse quantizer 420, an inverse transformer 430, an adder 440, a predictor 450, and a reference image memory 460.

The decoder 410 may restore the quantized transformed image as well as motion vector resolution by decoding encoded data extracted from the bitstream and perform a decoding process by inversely performing the encoding process of the encoder 150 described above with reference to FIG. 1.

The inverse quantizer 420 and the inverse transformer 430 may restore a residual image having a residual signal by inversely quantizing and inversely transforming the quantized transformed image and perform the inverse quantization and the inverse transform by inversely performing the transform by the transformer 130 and the quantization by the quantizer 140 described above with reference to FIG. 1.

The adder 440 may restore an image by adding the residual image restored by the inverse quantizer 420 and the inverse transformer 430 described above to the predicted image generated from the predictor 450 to be described below. The adder 440 may output a restored image by accumulating images in units of images or store the images in the reference image memory 460 to utilize the stored images so as to predict the next image.

The predictor 450 generates a predicted block by compensating for motions of blocks to be encoded using the motion vector restored by the decoder 410. A group of predicted blocks grouped in a predetermined encoding unit is configured.

However, the conventional video encoding/decoding apparatus described above has a disadvantage in that motion prediction and compensation, transform and quantization, inverse transform and inverse quantization, and encoding or decoding operations to which given schemes are fixedly applied are performed on all input images.

In other words, each image has a different attribute or characteristic. For example, when a general natural image is compared to an image containing content such as text, graphic, and lines, there is a difference in that the latter includes more edge components because a boundary is shown to be enhanced as compared to the former. The conventional video encoding/decoding apparatus has a problem in that the motion prediction and compensation, transform and quantization, inverse transform and inverse quantization, and encoding or decoding operations are performed on all input images including the two images in a packaged scheme.

In relation to this, Korean Patent Application Publication No. 10-2010-0045549 (Title of the invention: Method and apparatus for encoding/decoding an image using an adaptive interpolation filter coefficient) discloses technology for interpolating a reference image by adaptively determining a coefficient of an interpolation filter for every frame. However, there is still a limitation in this conventional technology which targets only a specific part or a very narrow part in all encoding/decoding processes on an image.

SUMMARY

Accordingly, example embodiments of the present invention are provided to substantially obviate one or more problems due to limitations and disadvantages of the related art.

Example embodiments of the present invention provide a video encoding/decoding apparatus and a video encoding/decoding method using an adaptive scheme in which the video encoding/decoding apparatus more efficiently encodes/decodes images by classifying input images into two or more different categories according to preset attributes and encoding/decoding the classified images in different schemes according to the categories of the input images.

In some example embodiments, a video encoding apparatus includes: an image analyzer configured to analyze image characteristics for an input image in units of coding blocks and classify the coding blocks into two or more categories based on the image characteristics; and a transformer configured to perform a transform by referring to the categories of the coding blocks.

Here, the image characteristics may include information about at least one of directivity, an edge component distribution, and a color format of the image.

Here, the two or more categories are classified to include at least one of screen content including text or graphics, a natural image, and a depth map.

Here, the video encoding apparatus may further include: a color format converter configured to convert color formats of the coding blocks by referring to the categories of the coding blocks.

Here, the transformer may skip the transform by referring to the categories of the coding blocks.

Here, the video encoding apparatus may further include: a quantizer configured to perform quantization by referring to the categories of the coding blocks.

Here, the quantizer may skip the quantization by referring to the categories of the coding blocks.

Here, the video encoding apparatus may further include: an intra-predictor configured to perform intra-prediction by referring to the categories of the coding blocks; an inter-predictor configured to perform inter-prediction by referring to the categories of the coding blocks; and a filter configured to perform filtering by referring to the categories of the coding blocks.

Here, the intra-predictor may skip the intra-prediction by referring to the categories of the coding blocks, and the filter may change resolution by referring to the categories of the coding blocks.

Here, the intra-predictor may perform the intra-prediction by representing a pixel of the image by an index of a preset lookup table (LUT) when the category of the coding block is a depth map.

In other example embodiments, a video decoding apparatus includes: a decoder configured to calculate categories of coding blocks classified into two or more categories based on image characteristics for an input image analyzed in units of coding blocks by decoding a bitstream; an inverse quantizer configured to perform inverse quantization by referring to the categories of the coding blocks; and an inverse transformer configured to perform an inverse transform by referring to the categories of the coding blocks.

Here, the decoder may calculate color formats of the coding blocks based on the categories of the coding blocks.

Here, the inverse quantizer may skip the inverse quantization by referring to the categories of the coding blocks Here, the inverse transformer may skip the inverse transform by referring to the categories of the coding blocks.

Here, the video decoding apparatus may further include: an intra-predictor configured to perform intra-prediction by referring to the categories of the coding blocks; an inter-predictor configured to perform inter-prediction by referring to the categories of the coding blocks; and a filter configured to perform filtering by referring to the categories of the coding blocks.

Here, the intra-predictor may skip the intra-prediction by referring to the categories of the coding blocks, and the filter may change resolution by referring to the categories of the coding blocks.

Here, the intra-predictor may perform the intra-prediction by representing a pixel of the image by an index of an LUT when the category of the coding block is a depth map.

In still other example embodiments, a video decoding method includes: calculating categories of coding blocks classified into two or more categories based on image characteristics for an input image analyzed in units of coding blocks by decoding a bitstream; performing inverse quantization by referring to the categories of the coding blocks; and performing an inverse transform by referring to the categories of the coding blocks.

According to the above-described example embodiments of the present invention, the video encoding/decoding apparatus to which an adaptive scheme is applied more efficiently encodes/decodes images by classifying input images into two or more different categories according to preset attributes and encoding/decoding the images in different schemes, thereby encoding/decoding the images more efficiently without loss of important information than the conventional technology to which the packaged scheme is applied.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
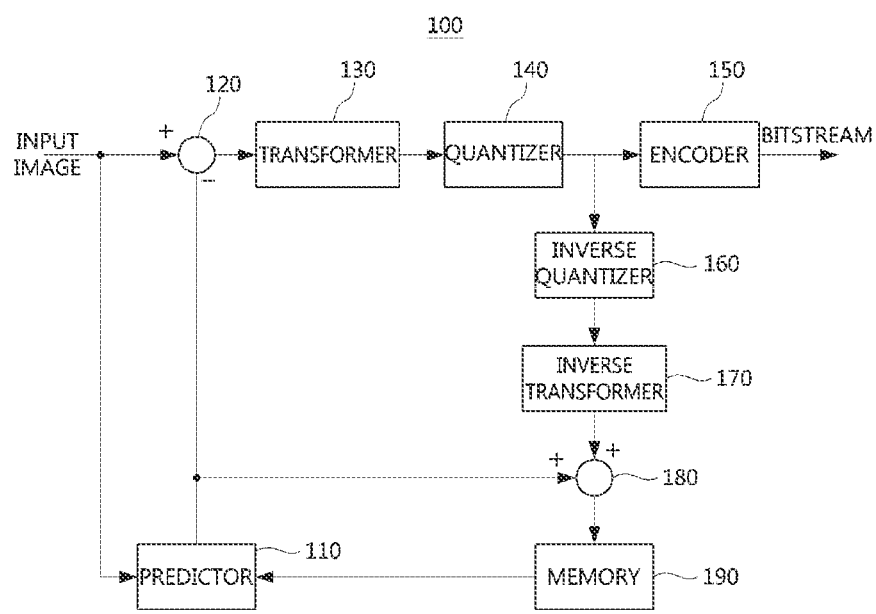
FIG. 1 is a block configuration diagram schematically illustrating a conventional video encoding apparatus.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein. Elements of the example embodiments are consistently denoted by the same reference numerals throughout the drawings and detailed description.

In the present specification, when a constituent element "connects" or is "connected" to another constituent element, the constituent element contacts or is connected to the other constituent element not only directly but also electrically through at least one of other constituent elements interposed therebetween. Also, when a part may "include" a certain constituent element, unless specified otherwise, it may not be construed to exclude another constituent element but may be construed to further include other constituent elements.

In general, a video may be constituted of a series of images and each image may be divided into predetermined regions such as blocks.

In addition, concepts of a coding unit (CU), a prediction unit (PU), and a transform unit (TU) are defined in HEVC, the standardization of which is currently in progress. The CU is similar to an existing macroblock, but encoding may be performed while the magnitude of the CU is variably adjusted. The PU may be determined in the CU which is no longer divided and determined based on a prediction type and a PU splitting process. The TU is that for the transform and quantization and may be greater than the magnitude of the PU but may not be greater than the CU. Accordingly, in the present invention, the block may be understood as a meaning equivalent to a unit.

In addition, a block to be referred to encode or decode a current block is referred to as a reference block and a pixel to be referred to encode or decode a current pixel is referred to as a reference pixel. In addition, those skilled in the art may understand that the term "image" disclosed hereinafter may be replaced with other terms having the meanings equivalent to a picture, a frame, and the like.

In addition, in the specification of the present invention, the coding block may be used as a concept including the CU, the PU, and TU. The input image may be constituted of at least one coding block.

In addition, various sizes of 4×4 to 64×64 and 128×128 may be used as the size of the coding block.

Hereinafter, the present invention will be more specifically described with reference to the accompanying drawings.

Figure 2:
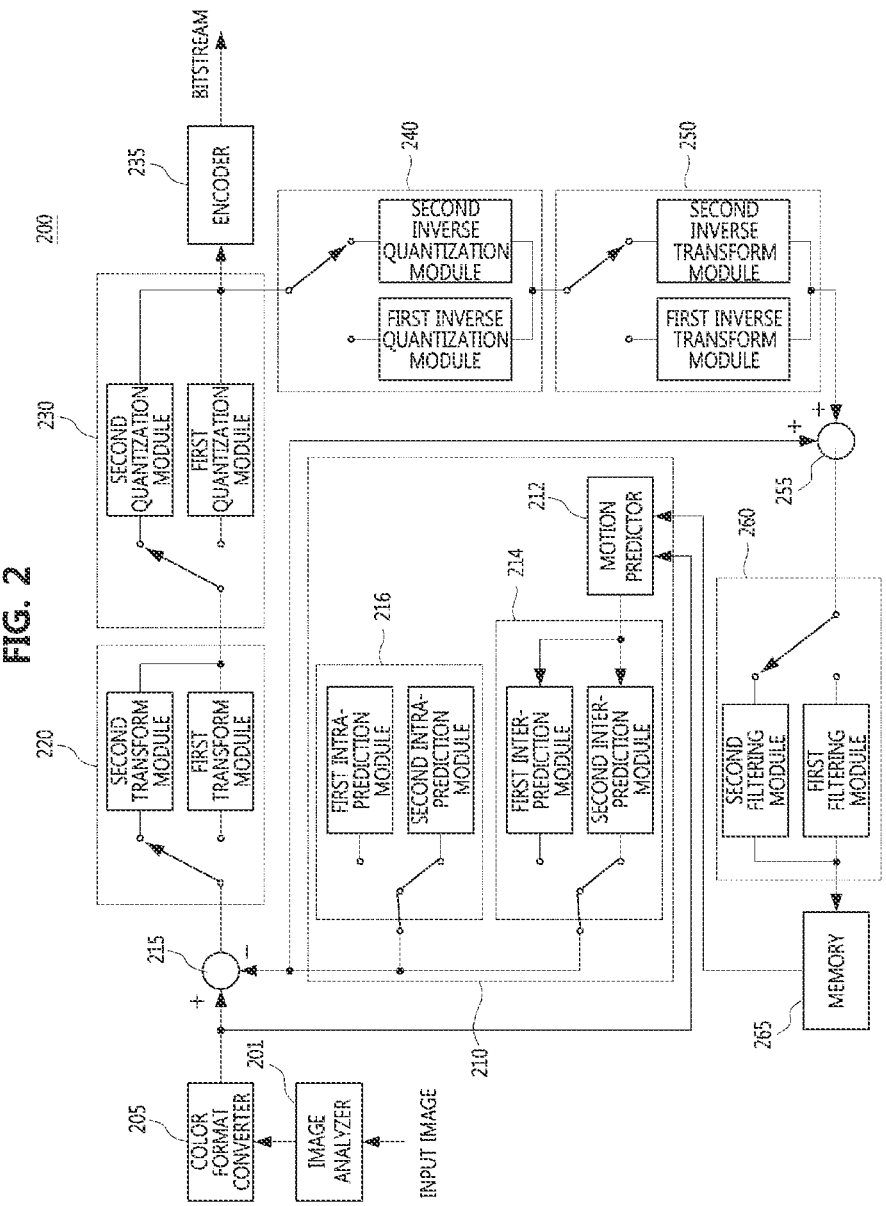
FIG. 2 is a block configuration diagram schematically illustrating a video encoding apparatus to which an adaptive scheme is applied according to an example embodiment of the present invention.

FIG. 2 is a block configuration diagram schematically illustrating a video encoding apparatus to which an adaptive scheme is applied according to an example embodiment of the present invention.

The video encoding apparatus 200 to which the adaptive scheme is applied according to the example embodiment of the present invention includes an image analyzer 201, a color format converter 205, an inter-predictor 214, an intra-predictor 216, a transformer 220, a quantizer 230, an inverse quantizer 240, and an inverse transformer 250. The video encoding apparatus 200 is technically characterized in that images classified into two or more categories according to preset attributes are set as input images and a module including each module described above operates in a different scheme according to the category.

As described above, the image may be a general natural image, an image containing content such as text, graphic, and lines, a depth map related to a multi-view video or a three-dimensional (3D) video signal, and the like. Each of these images may have a different attribute and characteristic. In order to reduce inefficiency caused by a packaged scheme applied to all images, images are classified into two or more categories according to preset attributes and input in the present invention and modules included in each configuration of the video encoding apparatus according to an example embodiment of the present invention operate in different schemes according to the category. Here, an attribute associated with the input image is not limited to a special specific standard.

The image analyzer 201 may analyze image characteristics for input images in units of coding blocks and classify the coding blocks into two or more categories based on the image characteristics.

The image analyzer 201 may analyze the image characteristics of the input images in the units of coding blocks. In addition, the image analyzer 201 may determine a coding block-specific category based on the image characteristics of the analyzed input image.

In the present invention, the categories may be classified into two types and the types of classified categories are not especially limited.

The classification of the categories may be determined based on image characteristics according to probabilistic and statistical characteristics and a signal model of an image signal such as directivity, an edge component distribution, and a color format of the image.

In particular, screen content including text, graphics, lines, and the like has different image characteristics from the general natural image. That is, because the screen content may have more edge components than the general natural image, the screen content may have more discontinuous and sharp image characteristics than the general natural image.

In addition, although the depth map may have similar image characteristics to the screen content in that the depth map is represented by a broad low-frequency domain and the edge component is clear because a brightness value rapidly varies, the depth map may have more simplified image characteristics.

In detail, compared to the screen content, the depth map may be configured in a black-and-white format. That is, the depth map may represent a depth value which is distance information as a luminance difference. For example, in the depth map, a depth value for an object may have a smaller value than a depth value for a background.

In addition, although the depth map may be encoded by encoding the depth value itself, a signal represented by an index may be encoded after the depth value is represented by a prepared LUT and the depth value of a relevant pixel or block is represented by an index of the LUT.

Accordingly, the screen content, the depth map, and the natural image may be included in different categories. The images may be encoded or decoded by different methods according to the categories.

Because the image is encoded by the transform, the quantization, the intra-prediction, the inter-prediction, the filtering, and the like, it is possible to perform the transform, the quantization, the intra-prediction, the inter-prediction, and the filtering by different methods according to categories reflecting the image characteristics.

In addition, it is also important to determine an appropriate color format (or chroma format) according to image characteristics in a video encoding process. For example, YUV444, YUV422, YUV420, or the like may be used as the color format.

The color format converter 205 may convert the color format of the coding block by referring to the category of the coding block. For example, YUV444 may or may not be transformed into YUV422 or YUV420. Encoding may be performed by applying the color format of YUV444 to the coding block of the category corresponding to the screen content and applying the color format of YUV422 or YUV420 to the coding block of the category corresponding to the general natural image.

In addition, because the depth image may be configured in the black-and-white signal form without being configured in a color component, the depth map may be encoded by applying a color format constituted of only Y which is a brightness signal component.

The predictor 210 is configured to include a motion predictor 212 configured to generate a motion vector of an input image, an inter-predictor 214 for inter-prediction, and an intra-predictor 216 for intra-prediction, and generates a predicted image of an input image by performing intra- or inter-prediction.

The inter-predictor 214 is configured to include two or more inter-prediction modules configured to generate a predicted block by referring to one or more past or future images and predicting a current block within a current image and perform different inter-predictions according to categories of the above-described input image (or coding block). That is, the inter-predictor 214 receives a motion vector determined from the motion predictor 212 using a reference image to be referred to encode or decode a current image stored in the memory 265 and uses the received motion vector to generate a predicted block.

The inter-predictor 214 may perform the inter-prediction by referring to the categories of the coding blocks divided by the image analyzer 201.

In particular, the inter-predictor 214 adaptively determines an inter-prediction module to be operated according to a category of an input image (or coding block) and the inter-prediction module determined from among two or more inter-prediction modules performs inter-prediction as in the following example. For example, the first inter-prediction module performs inter-prediction by an inter-prediction scheme performed by the inter-predictor of the conventional video encoding apparatus 100 illustrated in FIG. 1 and the second inter-prediction module performs motion prediction and compensation after enhancing an edge component of the reference image or performs inter-prediction through interpolation considering an edge at the timing of interpolating the reference image so as to effectively predict an edge of the current block, so that an operation may be optimally performed on an image containing content.

For example, the inter-predictor 214 may estimate motion in units of sub-pixels after interpolating a signal of a ½ or ¼ pixel position between integer pixels so as to efficiently eliminate a correlation between screens. That is, it is possible to select and use the most appropriate interpolation filter among a large number of interpolation filters according to characteristics of input images.

In addition, it is possible to select one of a plurality of interpolation filters according to a type of color format of an input image. At this time, it is possible to select and use one of a plurality of interpolation filters for a brightness signal and select and use one of a plurality of interpolation filters for a color signal.

In addition, when the input image is a depth map, it is possible to encode a residual depth value after generating a residual depth value by predicting a depth value for a current encoding target image from a reference depth map.

At this time, it is possible to create a residual signal through direct prediction for the depth value itself. As another example embodiment, the depth value may be represented by a prepared lookup table (LUT). In this case, it is possible to use an index corresponding to a relevant depth value in the LUT. That is, the predicted depth value and the depth value of the current block are all represented by indices of the LUT, and a residual signal may be a difference value between the indices.

In addition, the inter-predictor 214 may further include an inter-prediction module configured to perform inter-prediction in a different scheme from the first and second inter-prediction modules in addition to the first and second inter-prediction modules illustrated in FIG. 2.

The intra-predictor 216 is configured to include two or more intra-prediction modules configured to generate a predicted block (image) by predicting a pixel of a current block using pixels of previously encoded blocks within the current image to be currently encoded and pixels of blocks restored after decoding and perform different intra-predictions according to categories of the above-described input image (or coding block).

The intra-predictor 216 may perform intra-prediction by referring to the category of the coding block classified by the image analyzer 201.

In particular, the intra-predictor 216 adaptively determines an intra-prediction module to be operated according to a category of an input image (or coding block), and the intra-prediction module determined from among two or more intra-prediction modules performs intra-prediction as in the following example. For example, the first intra-prediction module performs intra-prediction by an intra-prediction scheme performed by the intra-predictor of the conventional video encoding apparatus 100 illustrated in FIG. 1 and the second intra-prediction module performs motion prediction by employing edge information of blocks arranged around a current block or performing intra-prediction in which difference pulse code modulation (DPCM) is performed in units of pixels, so that an operation may be optimally performed on an image containing content.

As another example embodiment of the second intra-prediction module, when the input image is a depth map, it is possible to encode a residual depth value (depth value difference value) after generating a residual depth value by predicting depth values of pixels within a current encoding block from depth values of adjacent pixels of the current block.

At this time, it is possible to create a residual signal through direct prediction for the depth value itself. As another example embodiment, the depth value may be represented by an LUT. In this case, it is possible to use an index corresponding to a relevant depth value in the LUT. That is, the predicted depth value and the depth value of the current block are all represented by indices of the LUT, and a residual signal may be a difference value between the indices.

In addition, the intra-predictor 216 may further include an intra-prediction module configured to perform intra-prediction in a different scheme from the first and second intra-prediction modules in addition to the first and second intra-prediction modules illustrated in FIG. 2.

For example, when the input image is a depth map, the intra-predictor 216 may perform intra-prediction based on an edge-based contour or region division and skip the intra-prediction on the depth map.

The transformer 220 is configured to include two or more transform modules configured to generate a transformed image by transforming a residual image including a residual signal generated by the subtractor 215 into a frequency domain and perform different transform operations according to categories of the above-described input image (or coding block).

The transformer 220 may perform a transform by referring to a category of the coding block. In addition, the transformer 220 may skip the transform by referring to the category of the coding block.

For example, the transformer 220 may transform a coding block of a relevant category corresponding to a general natural image and skip the transform on the coding block of the category corresponding to the screen content or the depth map.

In addition, the transformer 220 may make transforms for the residual signal by the inter-prediction and the residual signal by the intra-prediction different. For example, it is possible to skip the transform on the residual signal by the intra-prediction for the coding block of the category corresponding to the screen content or the depth map and perform the transform on the residual signal by the inter-prediction for the coding block of the category corresponding to the screen content or the depth map.

In addition, it is possible to adaptively determine whether to perform the transform and a transform method according to rate distortion optimization.

Accordingly, in the present invention, it is possible to adaptively determine whether to perform the transform and a transform method in consideration of categories based on image characteristics and whether to perform the transform and the transform method are not especially limited.

In particular, the transformer 220 adaptively determines a transform module to be operated according to a category of an input image (or coding block) and the transform module determined from among two or more transform modules performs the transform as in the following example. For example, the first transform module performs a transform operation by a transform scheme (Hadamard transform, DCT, DST, or the like) performed by the conventional transformer 130 illustrated in FIG. 1 and the second transform module does not perform the transform or performs only a one-dimensional (1D) transform different from the two-dimensional (2D) transform of the first transform module so as to maximize coding efficiency or image quality, so that an operation may be optimally performed on an image containing content. In addition, the transformer 220 may further include a transform module configured to perform the transform operation in a different scheme from the first and second transform modules in addition to the first and second transform modules illustrated in FIG. 2.

The quantizer 230 is configured to include two or more quantization modules configured to generate a quantized transformed image by quantizing the transformed image generated by the transformer 220 and perform different quantization operations according to categories of the above-described input image (or coding block).

That is, the quantizer 230 may perform quantization by referring to a category of the coding block. In addition, the quantizer 230 may skip the quantization by referring to the category of the coding block.

For example, the quantizer 230 may quantize a coding block of a relevant category corresponding to a general natural image and skip the quantization on the coding block of the category corresponding to the screen content or the depth map.

In particular, the quantizer 230 adaptively determines a quantization module to be operated according to a category of an input image (or coding block) and the quantization module determined from among two or more quantization modules performs the quantization as in the following example. For example, the first quantization module performs a quantization operation by a quantization scheme (DZUTQ, a quantization weighted matrix, RDOQ, or the like) performed by the conventional quantizer 140 illustrated in FIG. 1 and the second quantization module may or may not quantize a predicted residual signal which is not transformed so as to effectively save important information and performs non-uniform quantization on a transform coefficient, so that an operation may be optimally performed on an image containing content. In addition, the quantizer 230 may further include a quantization module configured to perform the quantization operation in a different scheme from the first and second quantization modules in addition to the first and second quantization modules illustrated in FIG. 2.

The inverse quantizer 240 and the inverse transformer 250 restore a residual image by performing the inverse quantization and the inverse transform on some or all quantized transformed images transferred from the transformer 220 and the quantizer 230 described above. The inverse quantizer 240 is configured to include two or more inverse quantization modules configured to perform different inverse quantization operations according to categories of the above-described input image (or coding block). The inverse transformer 250 is configured to include two or more inverse transform modules configured to perform different inverse transform operations according to categories of the above-described input image (or coding block).

In particular, the inverse quantizer 240 and the inverse transformer 250 adaptively determine an inverse quantization module and an inverse transform module to be operated according to a category of an input image (or coding block), respectively, the inverse quantization module determined from among two or more inverse quantization modules performs inverse quantization as in the following example, and the inverse transform module determined from among two or more inverse transform modules performs an inverse transform as in the following example. For example, the first inverse quantization module and the first inverse transform module perform an inverse quantization operation in the inverse quantization scheme performed by the conventional inverse quantizer 160 illustrated in FIG. 1 and an inverse transform operation in the inverse transform scheme performed by the conventional inverse transformer 170, respectively, the second inverse quantization module performs the inverse quantization as in the second quantization module, and the second inverse transform module performs the inverse transform as in the second transform module, so that an operation may be optimally performed on an image containing content. In addition, the inverse quantizer 240 and the inverse transformer 250 may further include an inverse quantization module configured to perform the inverse quantization operation in a different scheme from the first and second inverse quantization modules in addition to the first and second inverse quantization modules illustrated in FIG. 2 and an inverse transform module configured to perform the inverse transform operation in a different scheme from the first and second inverse transform modules in addition to the first and second inverse transform modules illustrated in FIG. 2, respectively.

More preferably, the video encoding apparatus to which the adaptive scheme is applied according to the example embodiment of the present invention further includes a filter 260. The filter 260 may be configured to include two or more filtering modules configured to perform an operation of reducing distortion caused while encoding an image restored from the adder 255 in a given region unit and perform different filtering operations according to categories of the above-described input image (or coding block).

The filter 260 may perform filtering by referring to the category of the coding block.

In particular, the filter 260 adaptively determines a filtering module to be operated according to the category of the input image (or coding block) and a filtering module determined from among the two or more filtering modules performs a filtering operation as in the following example.

For example, the first filtering module performs a filtering operation by a filtering scheme (deblocking filtering, ALF, SAO, or the like) performed by the conventional filter and the second filtering module selects and performs one of schemes of the first filtering module or filters or performs filtering by a filter set in which specific filters are combined so as to maximize image quality, so that an operation may be optimally performed on an image containing content. In addition, the filter 260 may further include a filtering module configured to perform the filtering operation in a different scheme from the first and second filtering modules in addition to the first and second filtering modules illustrated in FIG. 2.

In addition, when the input image is a depth map, the filter 260 may perform down-sampling or up-sampling on the depth map. That is, the filter 260 may change the resolution of the depth map through re-sampling on the depth map.

In addition, the encoder 235 of the present invention generates a bitstream including encoded data by receiving a quantized transformed image from the quantizer 230 and encoding the quantized transformed image through entropy encoding technology or the like.

In addition, when technology according to the plurality of encoding methods described above is applied, a flag bit representing the applied encoding technology may be transmitted for every coding block or flag bits may be grouped and transmitted in a larger block unit. Flags grouped in the larger block unit may be encoded and then transmitted.

When the video encoding apparatus to which an adaptive scheme is applied according to an example embodiment of the present invention configured as described above is used, it is possible to perform efficient video encoding without loss of important information by obtaining encoded data according to different schemes classified according to categories in which attributes of input images are reflected.

Figure 3:
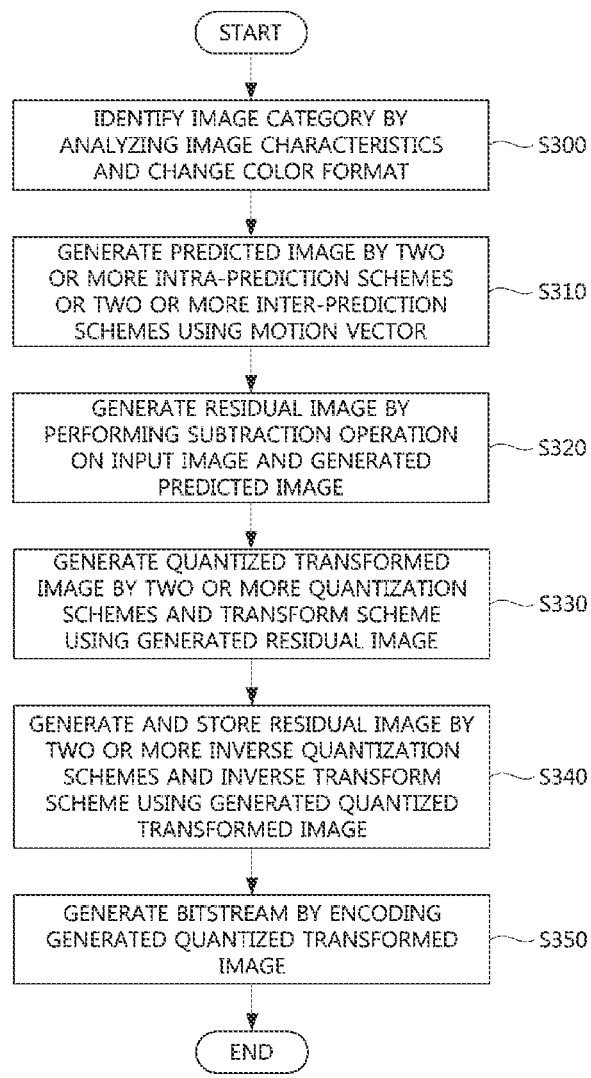
FIG. 3 is a flowchart illustrating a video encoding method to which the adaptive scheme is applied according to an example embodiment of the present invention.
Figure 4:
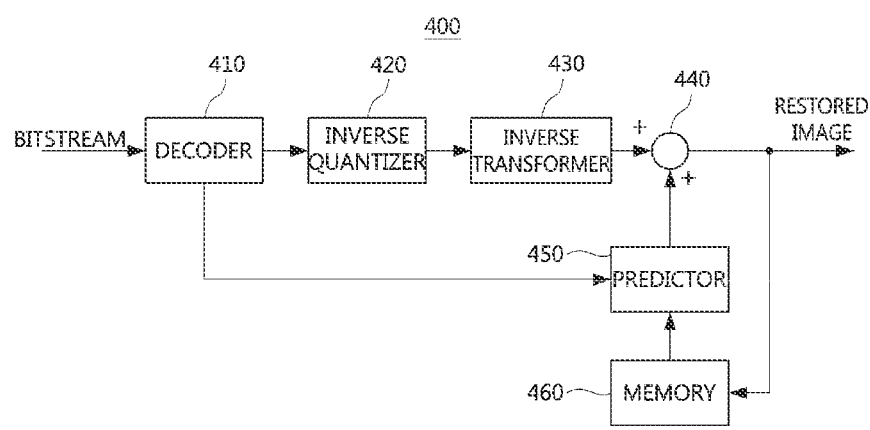
FIG. 4 is a block configuration diagram schematically illustrating a conventional video decoding apparatus.

FIG. 3 is a flowchart illustrating a video encoding method to which the adaptive scheme is applied according to an example embodiment of the present invention.

Referring to FIG. 3, the video encoding method according to the example embodiment of the present invention may be performed by the above-described video encoding apparatus. Accordingly, the above-described example embodiment associated with the video encoding apparatus may be applied to the video encoding method.

The video encoding method to which the adaptive scheme is applied according to the example embodiment of the present invention is characterized in that an input image (or coding block) is classified into two or more categories according to a preset attribute and a scheme to be performed for each process associated with encoding adaptively changes according to the category.

Image characteristics for an input image may be analyzed in units of coding blocks, the coding blocks may be classified into two or more categories based on the image characteristics, and color formats of the coding blocks may be converted by referring to the categories of the coding blocks (S300). Here, the image characteristics may include information about at least one of directivity, an edge component distribution, and a color format of the image. The two or more categories may be classified to include at least one of screen content including text or graphics, a natural image, and a depth map.

In order to generate a predicted image of an input image, the predictor performs inter-prediction by two or more inter-prediction schemes different from each other according to a category of an input image (or coding block) or performs intra-prediction by two or more intra-prediction schemes different from each other (S310). A residual image is generated by performing a subtraction operation on the input image and the predicted image generated by the predictor (S320). In particular, when the input image is a depth map, the intra-prediction may be performed based on an edge-based contour or region division and the intra-prediction for the depth map may be skipped.

Subsequently, after the transform operation by two or more transform schemes different from each other according to a category of an input image (or coding block) using the generated residual image, a quantized transformed image is generated by performing quantization operations by two or more quantization schemes different from each other according to the category of the input image (or coding block) using the transformed image generated by the transformer (S330).

For example, it is possible to transform a coding block of a category corresponding to a general natural image and skip the transform on the coding block of the category corresponding to the screen content or the depth map and it is possible to quantize the coding block of the category corresponding to the general natural image and skip the quantization on the coding block of the category corresponding to the screen content or the depth map.

After inverse quantization by two or more inverse quantization schemes different from each other according to the category of the above-described input image (or coding block) using the quantized transformed image, a residual image is restored by performing inverse transforms by two or more inverse transform schemes different from each other according to the category of the input image (or coding block) using the transformed image generated by the inverse quantizer, the predicted image is added to the restored residual image, and an adding result is stored in the memory (S340). It is possible to use a reference image stored in the memory for motion prediction of the input image if necessary thereafter and generate a residual image using a predicted image generated again.

The encoder generates a bitstream including encoded data using various encoding technologies from the quantized transformed image generated through the above process (S350).

In addition, before an input image restored by adding the predicted image to the restored residual image is stored in the memory, it is possible to additionally perform filtering processes by two or more filtering schemes different from each other according to the category of the input image (or coding block).

By performing each step for an input image according to the adaptive scheme, it is possible to obtain the encoded data of more improved efficiency than the conventional encoding method and reduce an important information loss rate.

Figure 5:
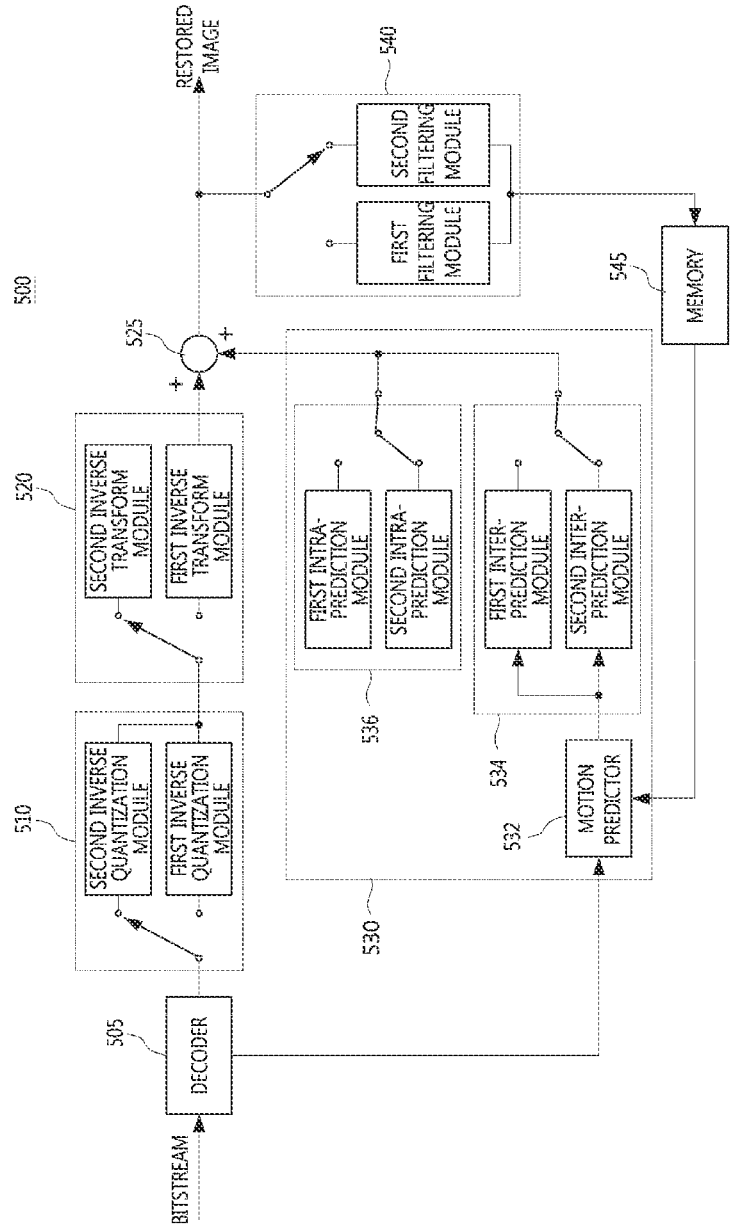
FIG. 5 is a block configuration diagram schematically illustrating a video decoding apparatus to which an adaptive scheme is applied according to an example embodiment of the present invention.

On the other hand, FIG. 5 is a block configuration diagram schematically illustrating a video decoding apparatus to which an adaptive scheme is applied according to an example embodiment of the present invention.

A video decoding apparatus 500 to which the adaptive scheme is applied according to the example embodiment of the present invention includes a decoder 505, an inverse quantizer 510, an inverse transformer 520, an inter-predictor 534, and an intra-predictor 536. The video decoding apparatus 500 is technically characterized in that images are classified into two or more different categories according to preset attributes and a module including each module described above operates in a different scheme according to the category.

As described above, the image may be a general natural image, an image containing content such as text, graphic, and lines, a depth map, and the like. Each of these images may have a different attribute and characteristic. In order to reduce inefficiency caused by a packaged scheme applied to all images, images are classified into two or more categories according to preset attributes and input in the present invention and modules included in each configuration of the video encoding apparatus according to the present invention operate in different schemes according to the category. Here, an attribute associated with the input image is not limited to a special specific standard.

Here, the image characteristics may include information about at least one of directivity, an edge component distribution, and a color format of the image, and the two or more categories may be classified to include at least one of screen content including text or graphics, a natural image, and a depth map.

The decoder 505 restores a motion vector and a quantized transformed image by decoding encoded data extracted from a bitstream.

In addition, the decoder 505 may calculate a category of a coding block classified into two or more categories based on image characteristics for an input image analyzed in units of coding blocks by decoding the bitstream. That is, the decoder 505 can calculate information about the category of the coding block by decoding the bitstream and identify a coding block-specific category from the calculated information. In addition, the decoder 505 can calculate a color format of the coding block based on the category of the coding block. That is, the color format may be determined in correspondence with the category of the coding block.

More specifically, the image decoded by the decoder 505 or information about the category of the coding block can be found through the decoded bitstream and a unit in which the information about the category is decoded and acquired may be a frame, slice, or block unit.

In addition, even when the information about the category is not obtained from the decoded bitstream, it is possible to decode a signal by inferring the category information from the restored information.

The inverse quantizer 510 is configured to include two or more inverse quantization modules configured to restore a transformed image by inversely quantizing the quantized transformed image transferred from the decoder 505 and perform different inverse quantization operations according to categories of the above-described input image (or coding block). That is, the inverse quantizer 510 can perform the inverse quantization by referring to the category of the coding block.

In particular, the inverse quantizer 510 adaptively determine an inverse quantization module to be operated according to a category of an input image (or coding block) and the inverse quantization module determined from among two or more inverse quantization modules performs inverse quantization as in the following example. For example, the first inverse quantization module performs the inverse quantization operation of the same inverse quantization scheme as the first inverse quantization module of the inverse quantizer 240 illustrated in FIG. 2 and the second inverse quantization module performs the inverse quantization operation of the same inverse quantization scheme as the second inverse quantization module of the inverse quantizer 240 illustrated in FIG. 2, so that an operation may be optimally performed on an image containing content. In addition, the inverse quantizer 510 may further include an inverse quantization module configured to perform the inverse quantization operation in a different scheme from the first and second inverse quantization modules in addition to the first and second inverse quantization modules illustrated in FIG. 5.

For example, the inverse quantizer 510 may perform inverse quantization on the coding block of the category corresponding to a general natural image and skip inverse quantization on the coding block of the category corresponding to the screen content or depth map.

The inverse transformer 520 is configured to include two or more inverse quantization modules configured to restore an inversely transformed image by inversely transforming the transformed image restored from the above-described inverse quantizer 510 and perform different inverse transform operations according to categories of the above-described input image (or coding block). That is, the inverse transformer 520 can perform the inverse transform by referring to the category of the coding block.

In particular, the inverse transformer 520 adaptively determine an inverse transform module to be operated according to a category of an input image (or coding block) and the inverse transform module determined from among two or more inverse transform modules performs inverse transform as in the following example. For example, the first inverse transform module performs the same inverse transform operation as the first inverse transform module of the inverse transformer 250 illustrated in FIG. 2 and the second inverse transform module performs the same inverse transform operation as the second inverse transform module of the inverse transformer 250 illustrated in FIG. 2, so that an operation may be optimally performed on an image containing content. In addition, the inverse transformer 520 may further include an inverse transform module configured to perform the inverse transform operation in a different scheme from the first and second inverse transform modules in addition to the first and second inverse transform modules illustrated in FIG. 5.

For example, the inverse transformer 520 can make inverse transforms on a residual signal by inter-prediction and a residual signal by intra-prediction different. That is, it is possible to skip the inverse transform on a residual signal by the intra-prediction on the coding block of the category corresponding to the screen content or depth map and perform the inverse transform on a residual signal by the inter-prediction on the coding block of the category corresponding to the screen content or depth map.

As another example embodiment, the inverse transformer 520 can skip the inverse transform on a residual signal by the inter- or intra-prediction on the coding block of the category corresponding to the screen content or depth map and perform the inverse transform on a residual signal by the inter- or intra-prediction on the coding block of the category corresponding to the natural image.

The predictor 530 is configured to include a motion predictor 532 using a restored motion vector, an inter-predictor 534 for inter-prediction, and an intra-predictor 536 for intra-prediction, and generates a predicted image of an input image by performing the intra- or inter-prediction.

The inter-predictor 534 is configured to include two or more inter-prediction modules configured to generate a predicted block by referring to one or more past and future images and predicting a current block within a current image and perform different inter-predictions according to categories of the above-described input image (or coding block).

In particular, the inter-predictor 534 adaptively determines an inter-prediction module to be operated according to a category of an input image (or coding block) and the inter-prediction module determined from among two or more inter-prediction modules including the first and second inter-prediction modules performs inter-prediction as in the first and second inter-prediction modules illustrated in FIG. 2.

The intra-predictor 536 is configured to include two or more intra-prediction modules configured to generate a predicted block (image) by predicting a pixel of a current block using pixels of previously encoded blocks within the current image to be currently encoded and pixels of blocks restored after decoding and perform different intra-predictions according to categories of the above-described input image (or coding block).

In particular, the intra-predictor 536 adaptively determines an intra-prediction module to be operated according to a category of an input image (or coding block) and the intra-prediction module determined from among two or more intra-prediction modules including the first and second intra-prediction modules performs intra-prediction as in the first and second intra-prediction modules illustrated in FIG. 2.

In addition, when the input image is a depth map, the intra-predictor 536 may perform intra-prediction based on an edge-based contour or region division and skip the intra-prediction on the depth map.

An another example embodiment of the second intra-predictor, when the restored image is a depth map, depth values of pixels within a current coding block can be predicted and generated from restored depth values of adjacent pixels of a current block. At this time, a predicted signal can be created through direct prediction on the depth value itself. As another example embodiment, the depth value may be represented by an LUT. In this case, it is possible to use an index corresponding to a relevant depth value in the LUT. That is, the index for the depth value within the current block can be predicted from the index corresponding to the depth value of the adjacent pixel. The predicted depth value and the depth value of the current block are all represented by LUT indices and the restored residual signal may be a difference value between the indices.

More preferably, the video encoding apparatus to which the adaptive scheme is applied according to the example embodiment of the present invention further includes a filter 540. The filter 540 may be configured to include two or more filtering modules configured to perform an operation of reducing distortion caused during encoding of an image restored from the adder 525 to be described later in a given region unit and perform different filtering operations according to categories of the above-described input image (or coding block).

In particular, the filter 540 adaptively determines a filtering module to be operated according to a category of an input image (or coding block) and a filtering module determined from among the two or more filtering modules including the first and second filtering modules performs a filtering operation as in the first and second filtering modules illustrated in FIG. 2.

For example, when the input image is a depth map, the filter 540 may perform down-sampling or up-sampling on the depth map. That is, the filter 540 may change the resolution of the depth map through re-sampling on the depth map.

Accordingly, the intra-predictor 536 may perform intra-prediction by referring to the category of the coding block, the inter-predictor 534 may perform inter-prediction by referring to the category of the coding block, and the filter 540 may perform filtering by referring to the category of the coding block.

In addition, the adder 525 may restore an image by adding the restored residual image to the generated predicted image, the memory 545 may store the restored image or the filtered restored image in a given unit, and image information stored in the motion predictor 535 of the predictor 530 is transferred if necessary.

When the video encoding apparatus to which an adaptive scheme is applied according to an example embodiment of the present invention configured as described above is used, it is possible to perform efficient video decoding without loss of important information by restoring images according to different schemes classified according to categories in which attributes of input images are reflected.

That is, the video decoding apparatus 500 according to the example embodiment of the present invention may decode an adaptively encoded image according to the category of the coding block.

The video decoding apparatus 500 may calculate information about the category of the coding block as information obtained by analyzing image characteristics of an input image in units of coding blocks and decode the image using a different method according to the category of the coding block.

In the present invention, the categories may be classified into two types and the types of classified categories are not especially limited.

The classification of the categories may be determined based on image characteristics according to probabilistic and statistical characteristics and a signal model of an image signal such as directivity, an edge component distribution, and a color format of the image.

In particular, screen content including text, graphics, lines, and the like and a depth map associated with a 3D video or multi-view video signal have different image characteristics from the general natural image. That is, because the screen content may have more edge components than the general natural image, the screen content may have more discontinuous and sharp image characteristics than the general natural image. In addition, the depth map has similar characteristics to the screen content image and has a different characteristic from the screen content image in that the depth map includes only a black/white signal and depth values for a background and an object are different.

Accordingly, the screen content, the depth map, and the natural image may be included in different categories. The images may be encoded or decoded by different methods according to the categories.

In addition, it is also important to determine an appropriate color format (or chroma format) according to image characteristics in encoding and decoding images. For example, YUV444, YUV422, YUV420, or the like may be used as the color format.

Accordingly, the video decoding apparatus 500 may calculate the color format of the coding block according to the category of the coding block. For example, decoding may be performed by applying the color format of YUV444 to the coding block of the category corresponding to the screen content and applying the color format of YUV422 or YUV420 to the coding block of the category corresponding to the general natural image.

For example, the depth map may be encoded or decoded in a black/white image format constituted of only Y. In addition, after the depth value of the depth map is represented in the form of a pre-arranged LUT, it is possible to perform an encoding or decoding process in the form in which the depth value is represented by an index of the LUT without being directly represented.

Accordingly, in first and second modules of functional modules constituting the video encoding apparatus and the video decoding apparatus according to the example embodiment of the present invention, the first module may be technology to be used in existing CODECs and the second module may cause a signal to pass through without performing any operation. For example, in the filtering modules, the first and second filtering modules may perform different filtering functions and one of the two modules may not perform any filtering operation.

Figure 6:
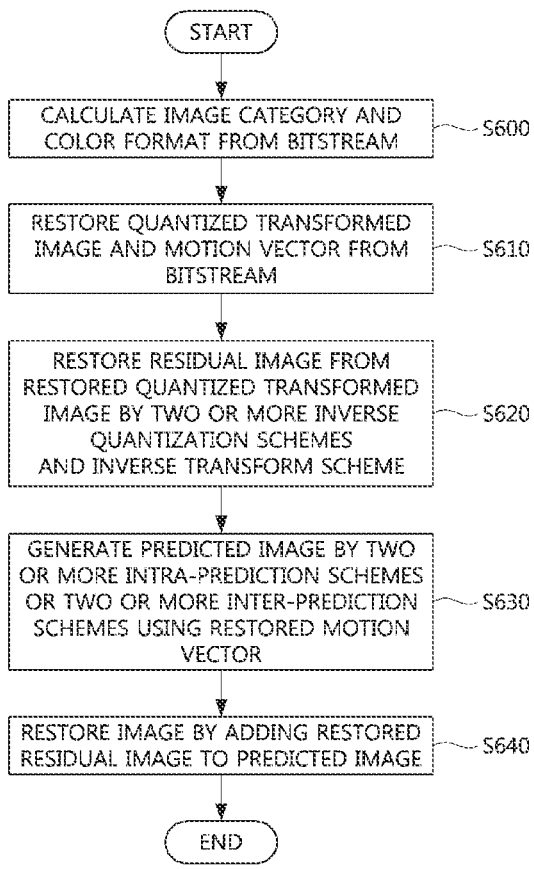
FIG. 6 is a flowchart illustrating a video decoding method to which the adaptive scheme is applied according to an example embodiment of the present invention.

In addition, FIG. 6 is a flowchart illustrating a video decoding method to which the adaptive scheme is applied according to an example embodiment of the present invention.

Referring to FIG. 6, the video decoding method according to the example embodiment of the present invention may be performed by the above-described video decoding apparatus. Accordingly, the above-described example embodiment associated with the video decoding apparatus may be applied to the video decoding method.

The video decoding method to which the adaptive scheme is applied according to the example embodiment of the present invention is characterized in that an input image (or coding block) is classified into two or more categories according to a preset attribute and a scheme to be performed for each process associated with decoding adaptively changes according to the category.

It is possible to calculate a category of a coding block classified into two or more categories based on image characteristics for an input image analyzed in units of coding blocks by decoding the bitstream (S600). That is, it is possible to calculate information about the category of the coding block by decoding the bitstream and identify a coding block-specific category from the calculated information.

For example, the image characteristics may include information about at least one of directivity, an edge component distribution, and a color format of the image, and the two or more categories may be classified to include at least one of screen content including text or graphics, a natural image, and a depth map.

The decoder decodes encoded data extracted from the bitstream and restores a quantized transformed image and a motion vector using various decoding technologies (S610).

After inverse quantization by two or more inverse quantization schemes different from each other according to the category of the above-described input image (or coding block) using the quantized transformed image, a residual image is restored by performing an inverse transform by two or more inverse transform schemes different from each other according to the category of the input image (or coding block) using the transformed image generated by the inverse quantizer, the predicted image is added to the restored residual image, and an adding result is stored in the memory (S620). It is possible to use a reference image stored in the memory for motion prediction of the input image if necessary thereafter and generate a residual image using an input image and a predicted image.

For example, it is possible to inversely quantize the coding block of the category corresponding to the general natural image and skip the inverse quantization on the coding block of the category corresponding to the screen content or the depth map. In addition, it is possible to skip the inverse transform on the residual signal by the intra-prediction for a coding block of a category corresponding to the screen content or the depth map and perform the inverse transform on the residual signal by the inter-prediction for the coding block of the category corresponding to the screen content or the depth map.

As another example embodiment, it is possible to skip the inverse transform on the residual signal by the inter- or intra-prediction on the coding block of the category corresponding to the screen content or the depth map and perform the inverse transform on the residual signal by the inter- or intra-prediction on the coding block of the category corresponding to the general natural image.

Subsequently, the predictor generates a predicted image of the input image by performing inter-prediction by two or more inter-prediction schemes different from each other according to a category of an input image (or coding block) or performing intra-prediction by two or more different intra-prediction schemes (S630) and restores the image by adding the restored residual image to the generated predicted image (S640).

For example, when the input image is a depth map, the intra-prediction may be performed based on an edge-based contour or region division and the intra-prediction for the depth map may be skipped.

In addition, before an input image restored by adding the predicted image to the restored residual image is stored in the memory, it is possible to additionally perform filtering processes by two or more filtering schemes different from each other according to the category of the input image (or coding block).

For example, when the input image is a depth map, it is possible to perform down-sampling or up-sampling on the depth map. That is, it is possible to change the resolution of the depth map through re-sampling on the depth map.

By performing each step for a bitstream including encoded data according to the adaptive scheme, it is possible to more efficiently restore an image than the conventional decoding method and reduce an important information loss rate in the decoding process.

It is appreciated that the present invention can be carried out in other specific forms without changing a technical idea or essential characteristics by one having ordinary skilled in the art to which the present invention pertains to. Therefore, embodiments described above are for illustration purpose in all respect but not limited to them. For example, each element described as a single type may be distributed, and similarly, elements described to be distributed may be combined.

Therefore, it should be understood that the invention is intended to cover not only the exemplary embodiments, but also various alternatives, modifications, equivalents and other embodiments, which may be included within the spirit and scope of the invention as defined by the appended claims.

What is claimed is:

1. A video decoding method performed by a video decoding apparatus, the method comprising:
  determining that intra skip coding is not applied to a current block;
  obtaining, at least partly based on the determination that the intra skip coding is not applied to the current block, information from a bitstream specifying that a contour mode based intra prediction is applied to the current block;
  deriving, at least partly in response to the information from the bitstream, a first depth value relating to the current block by performing the contour mode based intra prediction for the current block;
  deriving, based on the first depth value, a first index value using a first look up table specifying an index value corresponding to a depth value;
  deriving a second index value using the first index value and a residual index value, wherein the residual index value specifies a difference between the first index value and the second index value;
  obtaining a second depth value relating to the current block based on the second index value and a second look up table specifying a depth value corresponding to an index value;
  generating the prediction block for the current block based on the second depth value; and
  reconstructing the current block based on a prediction block that is generated by the contour mode based intra prediction.

2. The method of claim 1, wherein the second index value is derived by adding the residual index value to the first index value.

3. A video encoding method performed by a video encoding apparatus, the method comprising:
  determining that intra skip coding is not applied to a current block;
  determining, based on the determination that the intra skip coding is not applied to the current block, that a contour mode based intra prediction is to be applied to the current block;
  generating, based on the determination that the contour mode based intra prediction is to be applied to the current block, information specifying that the contour mode based intra prediction is performed for the current block;
  encoding the current block by performing the contour mode based intra prediction for the current block; and
  providing a bitstream that includes the encoded current block and the information specifying that the contour mode based intra prediction is performed for the current block,
  wherein the contour mode based intra prediction comprises:
  deriving a first depth value relating to the current block by performing the contour mode based intra prediction for the current block;
  deriving, based on the first depth value, a first index value using a first look up table specifying an index value corresponding to a depth value;
  deriving a second index value using the first index value and a residual index value, wherein the residual index value specifies a difference between the first index value and the second index value;
  obtaining a second depth value relating to the current block based on the second index value and a second look up table specifying a depth value corresponding to an index value; and
  generating a prediction block for the current block based on the second depth value.

4. The method of claim 3, wherein the second index value is derived by adding the residual index value to the first index value.

5. A non-transitory computer-readable recoding-medium storing a bitstream which is generated by a video encoding method, the method comprising:
- determining that intra skip coding is not applied to a current block;
- determining, based on the determination that the intra skip coding is not applied to the current block, that a contour mode based intra prediction is to be applied to the current block;
- generating, based on the determination that the contour mode based intra prediction is to be applied to the current block, information specifying that the contour mode based intra prediction is performed for the current block;
- encoding the current block by performing the contour mode based intra prediction for the current block; and
- providing a bitstream that includes the encoded current block and the information specifying that the contour mode based intra prediction is performed for the current block,
- wherein the contour mode based intra prediction comprises:
  - deriving a first depth value relating to the current block by performing the contour mode based intra prediction for the current block;
  - deriving, based on the first depth value, a first index value using a first look up table specifying an index value corresponding to a depth value;
  - deriving a second index value using the first index value and a residual index value, wherein the residual index value specifies a difference between the first index value and the second index value;
  - obtaining a second depth value relating to the current block based on the second index value and a second look up table specifying a depth value corresponding to an index value; and
  - generating a prediction block for the current block based on the second depth value.

6. The non-transitory computer-readable recoding-medium of claim 5, wherein the second index value is derived by adding the residual index value to the first index value.

* * * * *